United States Patent Office 3,454,482
Patented July 8, 1969

3,454,482
ELECTRODEPOSITION OF A COPOLYMER CONTAINING A CYCLIC COMPOUND HAVING BASIC NITROGEN ATOMS
Herbert Spoor, Mutterstadt, Pfalz, Heinz Pohlemann, Limburgerhof, Pfalz, Gerhard Florus, Ludwigshafen (Rhine), and Friedrich Schauder, Limburgerhof, Pfalz, Germany, assignors to Badische Anilin- & Soda-Fabrik Aktiengesellschaft, Ludwigshafen (Rhine), Germany
No Drawing. Filed Apr. 18, 1966, Ser. No. 543,076
Claims priority, application Germany, Apr. 24, 1965,
B 81,603
Int. Cl. C23b *13/00;* B01k *5/00*
U.S. Cl. 204—181     3 Claims

ABSTRACT OF THE DISCLOSURE

A process for producing coatings on electrically conducting articles by the cataphoresis of the copolymer set forth below from an aqueous solution or aqueous dispersion containing a salt of said copolymer, said copolymer having basic nitrogen atoms and being derived from:

(1) 3 to 50% by weight of a monocyclic or bicyclic compound having a five-membered to six-membered heterocycle which contains one to three hetero atoms of which at least one is a basic nitrogen atom and one is a nitrogen atom bearing a vinyl group;

(2) 3 to 30% by weight of an amide, N-alkylamide, N-hydroxyalkylamide and/or N-oxaalkylamide of acrylic acid and/or methacrylic acid;

(3) 20 to 94% by weight of an alkyl ester of acrylic acid and/or methacrylic acid and/or styrene and/or an alkylvinyl benzene; and (4) 0 to 30% by weight of another ethylenically unsaturated monomer.

It was found that a highly advantageous coating could be prepared principally due to the fact that salts of the subject copolymers were capable of separation from their aqueous solutions or dispersions by cataphoresis. The coatings also exhibited highly desirable adherence, hardness, elasticity and durability characteristics.

---

The present invention relates to a method for the production of coatings, particularly baked coatings, on electrically conducting articles, particularly metal articles, in accordance with which polymers having basic nitrogen atoms are electrochemically deposited from aqueous solutions or aqueous dispersions of salts of the polymers on the articles in the form of coatings by means of cataphoresis, followed if necessary by baking. (This method will hereinafter be referred to briefly as the cataphoresis method.)

It is known that coatings, particularly baked coatings, can be prepared on electrically conducting articles, particularly metal articles, by electrochemically depositing carboxylic acid anionic polymers from aqueous solutions or aqueous dispersions of salts of the polymers onto the articles in the form of coatings by means of anaphoresis followed if necessary by baking. (This method will hereinafter be referred to briefly as the anaphoresis method.)

A peculiarity of the anaphoresis method is that not only are the polymers deposited onto the articles (anode) but also nascent oxygen is disengaged at the articles and (when the articles consist of a base metal) metal ions may pass into solution. The two last-mentioned phenomena are often disadvantageous because nascent oxygen may chemically change the polymers in an undesirable way and metal ions may decrease the waterproofness of the coatings and also may discolor the coatings (the latter being particularly the case with articles of copper or copper alloys).

On the other hand, it is a peculiarity of the cataphoresis method that when the polymer is deposited on the articles (cathode), hydrogen is disengaged and no metal ions pass into solution (even when the articles consist of a base metal). Since in general hydrogen scarcely causes disadvantageous chemical change in the polymers, production of coatings by cataphoresis is to this extent advantageous as compared with production of coatings by anaphoresis. It has, however, not been possible hitherto to develop salts of polymers having basic nitrogen atoms from whose aqueous solutions or aqueous dispersions not only can the polymers be separated by means of cataphoresis but also coatings are obtained which exhibit in a high degree the properties desirable in coatings, such as strength of bond to the substrate, hardness, elasticity and also resistance to water and solvents.

The present invention has for its object to provide a cataphoresis method of the above-mentioned type with which it is possible to prepare coatings which exhibit to a high degree the properties desired in coatings, such as good bond strength, good hardness, good elasticity and also good resistance to water and solvents.

We have found that the said object is achieved by a cataphoresis method of the above defined type in which the aqueous solutions or dispersions of salts of polymers having basic nitrogen atoms contain, as the polymers, copolymers of:

(1) 3 to 50%, preferably 5 to 30%, by weight of a monocyclic or bicyclic compound having a five-membered to six-membered heterocycle containing one to three, preferably one to two, heteroatoms of which at least one is a basic nitrogen atom and one is a nitrogen atom which bears a vinyl group;

(2) 3 to 30%, preferably 5 to 30%, by weight of an amide, N-alkylamide, N-hydroxyalkylamide and/or N-oxaalkylamide of acrylic acid and/or methacrylic acid;

(3) 20 to 94%, preferably 50 to 90%, by weight of an alkyl ester of acrylic acid and/or methacrylic acid and/or styrene and/or an alkylvinyl benzene; and (4) 0 to 30%, preferably 0 to 20%, by weight of one or more other ethylenically unsaturated monomers.

The following details may be given concerning the individual components of the copolymers to be used according to the invention:

(1) The monocyclic or bicyclic compounds having a five-membered to six-membered heterocycle containing one to three, preferably one to two heteroatoms, should have at least one basic nitrogen atom and one heteroatom which is a nitrogen atom bearing a vinyl group. The basic nitrogen atom and the nitrogen atom which bears a vinyl group may be one and the same atom. Particularly suitable monocyclic or bicyclic compounds are those which contain no heteroatoms other than nitrogen and for the rest consist of hydrocarbon radicals having not more than twenty carbon atoms. Examples of suitable monocyclic compounds are N-vinylpyrazole, N-vinylimidazole, N - vinylimidazoline, N - vinylpiperidine and analogous compounds which bear methyl, ethyl or propyl as substituents on carbon atoms in the ring. Examples of suitable bicyclic compounds are N-vinylindole and its lower C-alkyl and C-alkoxy analogues.

The cataphoretic deposition, essential in the process according to this invention, of coherent coatings having good bond strength is influenced particularly favorably by N-vinylimidazoline, N-vinyl - 2 - alkylimidazolines having alkyl groups containing one to three carbon atoms, and N-vinylimidazole.

(2) Suitable amides are acrylamide and methacrylamide; examples of suitable N-alkylamides are alkylamides having one to four carbon atoms in the alkyl group, such as N-methylamide and N-butylamide; an example of suitable N-hydroxyalkylamides is N-methylolamide; suitable N-oxaalkylamides are particularly N-2-oxaalkylamides having two to five carbon atoms in the oxaalkyl radical, such as N-2-oxapropylamide and N-2-oxahexylamide.

(3) Suitable alkyl esters of acrylic acid and/or methacrylic acid are for example alkyl esters having one to eight carbon atoms in the alkyl group, particularly ethyl, n-propyl, isopropyl, n-butyl, isobutyl, tertiary-butyl and 2-ethylhexyl esters of acrylic acid and methacrylic acid. Examples of suitable alkylvinylbenzenes are α-alkylstyrenes, o-alkylstyrenes, m-alkylstyrenes and p-alkoxystyrenes having alkyl radicals containing one to three carbon atoms; styrene is preferred.

(4) Particularly suitable other ethylenically unsaturated monomers are monohydroxyalkyl esters of acrylic acid and/or methacrylic acid having two to six carbon atoms in the alkyl group, such as 2-hydroxyethyl ester, the 2-hydroxypropyl ester and the 4-hydroxybutyl ester, and also for example vinyl esters of alkane carboxylic acids of alkanes having one to five carbon atoms, acrylonitrile and/or methacrylonitrile and the salts of symmetrical and asymmetrical mono-(N,N,N-tri-$C_1$–$C_4$-alkyl ammonium) $C_1$–$C_6$-alkyl esters of acrylic acid and/or methacrylic acid.

It has proved to be advantageous in general for the copolymers to have K-values of 12 to 40 (according to H. Fikentscher, Cellulosechemie 13 (1932) 12–25).

Production of the copolymers may be carried out by conventional methods; it is not the subject of the present invention. It has proved to be advantageous to prepare the copolymers by solution polymerization in organic solvents, which may contain a small amount (up to about 10%) of water. Solvents or mixtures of solvents which have a solubility in water of at least 30 g./l. are particularly suitable as solvents. These solvents or mixtures of solvents generally need not be removed, or, if so, only partially (for example by distillation), from the mixtures when preparing the aqueous solutions or aqueous dispersions. Examples of suitable solvents are: methanol, ethanol, propanol, isopropanol, butanol, isobutanol, acetone, dioxane and tetrahydrofuran. Examples of suitable mixtures of solvents are butanol/xylene, propanol/toluene and dioxane/amyl acetate. Suitable methods for the production of copolymers by solution polymerization are described for example in "Methoden der organischen Chemie" (Houben-Weyl), volume XIV/1, pages 1044 to 1047 (section γ) or pages 774 to 782 (section ββ), Stuttgart, 1961.

The production of the salts of the copolymers may also be carried out by conventional methods; it is not the subject of this invention. The salts may be prepared for example by bringing acids or acid-reacting substances into contact with the copolymers. It is however also possible to bring the acid component into contact with the components of the copolymers before or during copolymerization. Examples of suitable acids or substances which react like acids are hydrochloric acid, sulfuric acid, phosphoric acid, acetic acid, maleic anhydride and formic acid.

Production of the aqueous solutions or aqueous dispersions of the salts of the copolymers may also be carried out by conventional methods; it is not the subject of the present invention. A suitable method consists in preparing dispersions from solutions of the copolymers in organic solvents and water and then adding the acid components thereto. Another suitable method consists in introducing the salts of the copolymers as such or in the form of their solutions in organic solvents into water. In general it is particularly advantageous to choose the working conditions as a whole so that the whole amount of the salt is present in the form of an aqueous solution or a major portion is present in the form of an aqueous solution and a minor portion in the form of a dispersion. Furthermore it is in general advantageous for the pH of the solutions or dispersions to be adjusted to a value of 1 to 8, preferably 3 to 6. This is generally the case when 0.2 to 1.5 acid-equivalents of the acid component are present per base-equivalent of component (1) (i.e., the monocyclic or bicyclic compound) of the copolymer. Finally it is also advantageous to adjust the solutions or dispersions prior to use so that they contain a total of 3 to 20% by weight of the salt.

The aqueous solutions or aqueous dispersions of the salts of the copolymers may additionally contain other binders which are soluble or dispersable in water and which are capable of being electrochemically deposited in admixture with the salts by means of cataphoresis. Examples of such binders are aminoplast condensates, phenoplast condensates, epoxide resins, alkyd resins or mixtures of such binders. The amount by weight of these additional other binders should advantageously not in general exceed the amount by weight of the salts of the copolymers. The solutions or dispersions may also contain assistants which are capable of electrochemical deposition in admixture with the salts by means of cataphoresis, such as pigments, cure catalysts and flow improvers.

The production of coatings from the aqueous solutions or aqueous dispersions on electrically conducting articles, particularly metal articles, is carried out by means of cataphoresis by electrochemical deposition and if necessary by subsequent baking. Here again the conventional methods may be used; the article is introduced into the solution or dispersion and made the cathode; another electrically conducting medium is also brought into contact with the solution or dispersion and made the anode. Since it is usually an advantage for no ions to pass from the anode into the solution or dispersion intended for coating, it is in general recommended that an anode of an appropriate material, such as carbon or a noble metal, be used or the anode chamber be separated from the solution or dispersion by a diaphragm. The coating itself may advantageously be effected at a D.C. voltage of 2 to 300 volts, preferably 20 to 150 volts; the temperature may advantageously be 10° to 50° C., preferably 20° to 40° C. The time required for coating is in general about 0.5 to 3 minutes. After the coating has been applied, the coated article is removed from the solution or dispersion, advantageously rinsed in water, and the coating is kept for 5 minutes to three hours, preferably twenty minutes to one hour, at temperature of 80° to 250° C., preferably at 120° to 170° C., for baking.

The process according to this invention is mainly suitable for the production of baked coatings on metal articles, and it is of special advantage that not only articles of iron and iron alloys, such as parts of automobile bodies, can be provided with high-grade coatings but also articles of copper or copper alloys. The process is also suitable for the production of coatings on other electrically conducting articles, such as metallized plastics and graphitized textile fabrics.

The invention is further illustrated by the following examples in which parts and percentages are by weight.

EXAMPLE 1

A solution of a copolymer of 20 parts of N-vinylimidazole (1), 25 parts of the N-2-oxahexylamide of acrylic acid (2), 30 parts of the 2-ethylhexyl ester of acrylic acid (3), 20 parts of styrene (3), and 5 parts of 4-hydroxybutyl ester of acrylic acid (4) in 100 parts of butanol, prepared by solution polymerization by a conventional method, is diluted with water to a solids content of 10% and adjusted to a pH value of 3.5 with hydrochloric acid.

The opalescent solution thus obtained is placed in an electrophoresis vessel of alloyed steel which is made the anode. A steel sheet, which is made the cathode, is suspended in the solution and a D.C. voltage of 20 volts is applied between the vessel and the sheet for a period of one minute. A coating is deposited on the submerged surface of the sheet. The sheet is then removed from the vessel, rinsed under running water and baked for twenty minutes at 170° C. The coating obtained has a layer thickness of 15 microns, a pendulum hardness of 135 seconds (according to Albert/König), and an Erichsen value of 9.7, and exhibits good resistance to water and corrosion and good flexural strength.

EXAMPLE 2

A copolymer of 10 parts of N-vinyl-2-methylimidazoline (1), 25 parts of the N-2-oxa-4-methylpentylamide of acrylic acid (2), 40 parts of the butyl ester of acrylic acid ($3^1$), and 25 parts of styrene ($3^2$) is used in a procedure analogous to that described in Example 1.

At a voltage of 100 volts, a coating is produced on the sheet which, after having been baked, has properties similar to the coating obtained according to Example 1.

EXAMPLE 3

A copolymer of 20 parts of N-vinylimidazole (1), 5 parts of acrylamide (2), 30 parts of the n-butyl ester of acrylic acid ($3^1$), 35 parts of the tertiary-butyl ester of acrylic acid ($3^2$) and 10 parts of the 4-hydroxybutyl ester of acrylic acid (4) is dissolved in 100 parts of isobutanol. 0.95 mole of acetic acid is added per mole of N-vinylimidazole and the whole mixed in a solids ratio of 80:20 with a 60% n-butanol solution of a water-soluble melamineformaldehyde resin, partially etherified with methanol, such as is conventionally used in baking lacquers. The mixture is diluted to a solids content of 8% and pigmented with titanium dioxide (ratio of binder to pigment=9:1).

The further procedure is analogous to that in Example 1. At 50 volts, a coating is produced on the sheet which, after having been baked, has a thickness of 18 microns, is resistant to bending, water and scratching, and is pure white.

We claim:
1. A process for the production of coatings on electrically conducting articles by electrochemical deposition thereon by means of cataphoresis of a copolymer from an aqueous solution or aqueous dispersion containing a salt of the copolymer, the copolymer having basic nitrogen atoms and being derived from:
 (1) 3 to 50% by weight of a monocyclic or bicyclic compound having a five-membered to six-membered heterocycle which contains one to three hetero atoms of which at least one is a basic nitrogen atom and one is a nitrogen atom bearing a vinyl group;
 (2) 3 to 30% by weight of an amide, N-alkylamide, N-hydroxyalkylamide and/or N-oxaalkylamide of acrylic acid and/or methacrylic acid;
 (3) 20 to 94% by weight of an alkyl ester of acrylic acid and/or methacrylic acid and/or styrene and/or an alkylvinyl benzene; and
 (4) 0 to 30% by weight of another ethylenically unsaturated monomer.

2. A process as claimed in claim 1 wherein the coating is subsequently baked.

3. Electrically conducting articles having coatings which have been prepared by electrochemical deposition by means of cataphoresis of a copolymer from an aqueous solution or aqueous dispersion containing a salt of the copolymer, the copolymer having basic nitrogen atoms and being derived from:
 (1) 3 to 50% by weight of a monocyclic or bicyclic compound having a five-membered to six-membered heterocycle which contains one to three hetero atoms of which at least one is a basic nitrogen atom and one is a nitrogen atom bearing a vinyl group;
 (2) 3 to 30% by weight of an amide, N-alkylamide, N-hydroxyalkylamide and/or N-oxaalkylamide of acrylic acid and/or methacrylic acid;
 (3) 20 to 94% by weight of an alkyl ester of acrylic acid and/or methacrylic acid and/or styrene and/or an alkylvinyl benzene; and
 of another ethylenically unsaturated monomer.
 (4) 0 to 30% by weight of another ethylenically unsaturated monomer.

References Cited

UNITED STATES PATENTS

| | | | |
|---|---|---|---|
| 2,206,090 | 7/1940 | Haggenmacher | 204—181 |
| 2,345,543 | 3/1944 | Wohnsiedler et al. | 204—181 |
| 2,721,852 | 10/1955 | Fowler et al. | 260—80.72 |
| 3,159,558 | 12/1964 | McCoy | 204—181 |
| 3,178,396 | 4/1965 | Lloyd | 260—80.72 |
| 3,178,397 | 4/1965 | Olaj et al. | 260—80.72 |
| 3,230,162 | 1/1966 | Gilchrist | 204—181 |
| 3,309,331 | 3/1967 | McDowell et al. | 260—80.72 |
| 3,378,477 | 4/1968 | Gentles et al. | 204—181 |

OTHER REFERENCES

Fink et al.: "Electrodeposition and Electrochemistry of the Deposition of Synthetic Resins," in Transactions of the Electrochemical Society, vol. 94, 1948, pp. 325–326.

HOWARD S. WILLIAMS, *Primary Examiner.*

E. ZAGARELLA, JR., *Assistant Examiner.*